Figure 1:
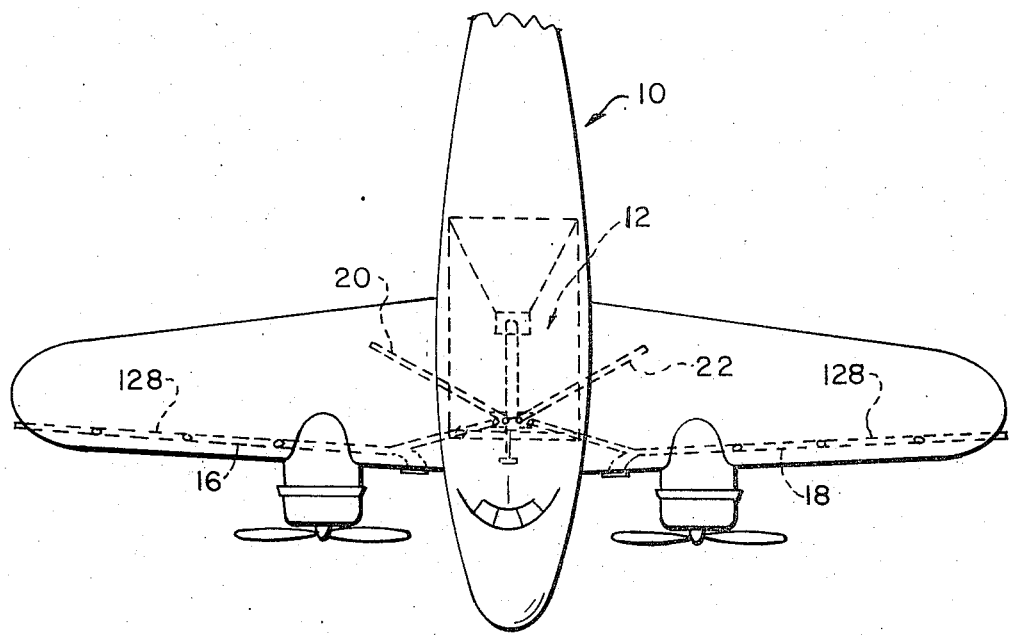
Figure 2:
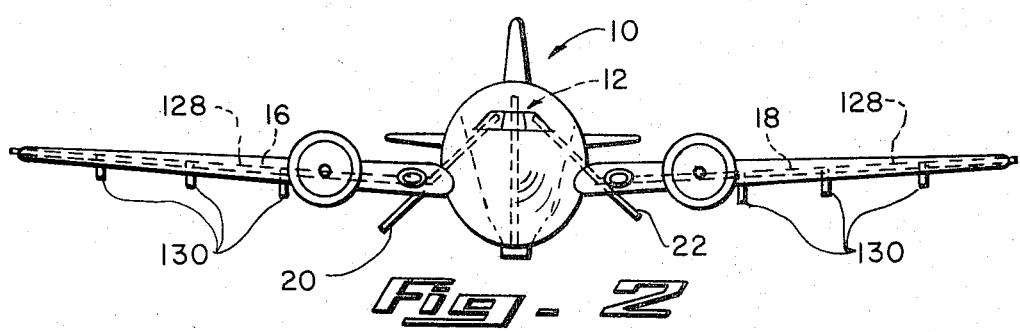

United States Patent
Johnson

[11] 3,860,202
[45] Jan. 14, 1975

[54] METHOD AND APPARATUS FOR DISPENSING GRANULAR MATERIAL FROM AIRCRAFT

[76] Inventor: Ralph S. Johnson, 907 Frontier Park Ave., Cheyenne, Wyo. 82001

[22] Filed: Sept. 5, 1972

[21] Appl. No.: 286,114

[52] U.S. Cl.................. 244/136, 222/185, 222/189, 222/194, 239/171
[51] Int. Cl............................................. B64d 1/18
[58] Field of Search.......... 244/136; 239/171; 169/2; 222/193, 194, 189, 178, 1, 185, 330, 413, 485

[56] References Cited
UNITED STATES PATENTS

| | | | |
|---|---|---|---|
| 1,673,087 | 6/1928 | Morse | 244/136 |
| 2,427,987 | 9/1947 | Wilson | 244/136 |
| 3,165,237 | 1/1965 | Stevens | 222/178 |
| 3,341,065 | 9/1967 | Schuldt et al. | 222/413 X |
| 3,351,243 | 11/1967 | Kennedy et al. | 222/189 |
| 3,484,062 | 12/1969 | Johnson | 244/136 |

*Primary Examiner*—Lloyd L. King
*Assistant Examiner*—Randolph A. Reese

[57] ABSTRACT

An aerial crop dusting apparatus for incorporation into an aircraft has a main storage hopper or bin for powdered or granular insecticide material, a feed mechanism for reliably transferring the insecticide material from the main storage bin to a dispensing system from which the material is uniformly distributed over a predetermined area beneath the aircraft. The feed mechanism includes an intermediate feed hopper or bin and a conveyor for removing the granular material from the storage bin and transferring the material to the feed hopper from which the material is uniformly and selectively fed into a plurality of dispensing ducts at an adjustable rate by adjustable control means. The intermediate feed hopper is designed to maintain the insecticide material in a loose flowable condition assuring reliable and uniform flow of the material into the dispensing ducts. The adjustable control means communicating with the feed hopper and the dispensing ducts are adapted to control both the rate of flow of the granular material from the feed hopper into the dispensing ducts and the proportionate amounts of the material flowing into the individual ducts. The method of the present invention includes the steps of storing a quantity of granular material in a storage hopper on an aircraft, transferring selected quantities of the material from the storage hopper to a feed hopper within the aircraft, feeding the material at a selected rate into dispensing ducts on the aircraft, and distributing the material from the dispensing ducts over a predetermined area beneath the aircraft.

15 Claims, 9 Drawing Figures

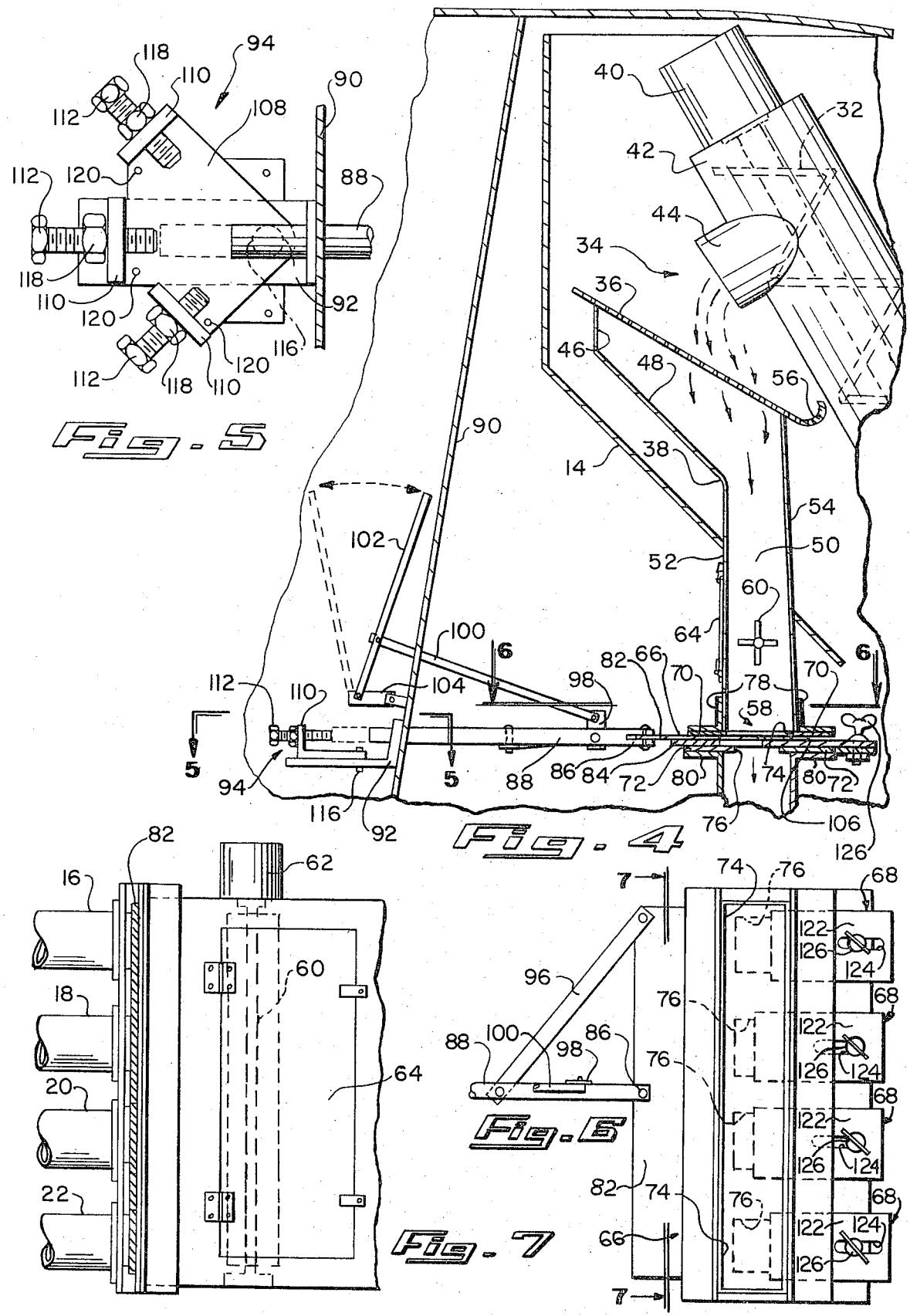

PATENTED JAN 14 1975

3,860,202

SHEET 3 OF 3

METHOD AND APPARATUS FOR DISPENSING GRANULAR MATERIAL FROM AIRCRAFT

BACKGROUND OF THE INVENTION

The present invention generally relates to a new and improved aerial dispensing method and apparatus, and more particularly relates to a method of dispensing powdered or granular insecticide material and means for advancing powdered or granular insecticide material from a storage hopper in a crop dusting aircraft to dispensing ducts in the aircraft from which the insecticide material is uniformly distributed over a predetermined area.

Typically, a crop dusting aircraft has a storage hopper or bin for a large quantity of powdered or granular insecticide material and a system for withdrawing the material from the storage hopper and effecting a desired dispersion of the material over a predetermined area beneath the aircraft. A prevalent problem with typical crop dusting apparatus is that the insecticide material in the storage hopper frequently becomes compacted due to the tremendous weight and quantity of the material stored in the hopper so that the free and uniform flow of the material from the storage hopper is impaired.

SUMMARY OF THE INVENTION

The feed mechanism of the present invention was developed to overcome the aforementioned problem and does so by positively withdrawing the insecticide material from the storage hopper and transferring the material to a relatively small, intermediate feed hopper while agitating the material to break up any compacted portions. The feed hopper is designed to maintain the material in a loose flowable condition and in adequate quantities to assure reliable and uniform flow of the material through adjustable valves to the dispensing ducts of the apparatus.

More specifically, according to the method and apparatus of the present invention, the granular material is withdrawn from the storage hopper and transferred along an agitating conveyor to a discharge location where the material is deposited onto a screen-type filter to remove large or foreign undesirable material. The smaller desirable granular material passes through the filter onto a collector tray and thereafter into the relatively small body portion of the feed hopper which has downwardly divergent side walls to minimize the pressure exerted on the granular material in the feed hopper and thereby minimize the degree of compaction. To further assure maintenance of a loose flowable condition of the material in the feed hopper, an agitator may be positioned within the lower portion of the feed hopper to continually move the material and prevent it from becoming compacted.

The lower wall of the feed hopper is defined by an adjustable control assembly including an adjustable master control gate for regulating the flow of insecticide material from the feed hopper, and proportioning gates adjustably positioned adjacent the inner ends of the dispensing ducts to enable selected control of the proportion of material flowing through each dispensing duct.

Accordingly, it is an object of the present invention to provide for an aerial dispensing method and apparatus which assures uniform and reliable transfer of powdered or granular insecticide material from a storage hopper in a crop dusting apparatus to dispensing ducts for desired uniform distribution from the ducts over a predetermined area.

It is another object of the present invention to provide a crop dusting apparatus having a new and improved feed mechansim for transferring insecticide material from a larger storage hopper to a smaller feed hopper wherein the insecticide material is reliably maintained in a loose flowable condition for controlled transfer into dispensing ducts of the apparatus.

It is another object of the present invention to provide a crop dusting apparatus having means for transferring insecticide material from a storage hopper to dispensing ducts of the apparatus and wherein the means includes a conveyor for removing insecticide material from the storage hopper and agitating the material to break down compacted segments of the material and a filter screen for separating relatively large foreign material from the insecticide material to assure free and uniform flow of the material from the apparatus.

It is another object of the present invention to provide a novel and improved method and means for transferring insecticide material from a main storage hopper to dispensing ducts of the apparatus in which the material is positively advanced from the storage hopper into a smaller feed hopper wherein the material is maintained in a loose flowable condition and followed by selectively controlling the rate and amounts of the material flowing into segregated dispensing ducts of the apparatus.

BRIEF DESCRIPTION OF THE DRAWING

The above and other objects, advantages and features of the present invention will become more readily appreciated and understood from a consideration of the following detailed description when taken together with the accompanying drawings, in which:

FIG. 1 is a fragmentary top plan view of a crop dusting aircraft having the crop dusting apparatus of the present invention incorporated therein.

FIG. 2 is a front elevation of the crop dusting aircraft shown in FIG. 1.

FIG. 2 is an enlarged fragmentary side elevation of the aircraft of FIG. 1 with parts broken away to show the crop dusting apparatus of the present invention.

FIG. 4 is an enlarged fragmentary diagrammatic vertical section taken through a portion of the crop dusting apparatus of the present invention particularly illustrating the feed hopper portion thereof.

FIG. 5 is an enlarged section taken along line 5—5 of FIG. 4.

FIG. 6 is an enlarged section taken along lines 6—6 of FIG. 4.

FIG. 7 is a fragmentary section taken along lines 7—7 of FIG. 6.

FIG. 8 is an enlarged fragmentary plan view of a wing section of the aircraft of FIG. 1 showing the dispensing ducts of the crop dusting apparatus; and FIG. 9 is an enlarged diagrammatic fragmentary view partially sectioned showing distributing downspouts for the apparatus of the present invention.

DESCRIPTION OF THE PREFERRED EMBODIMENT

Referring first to FIGS. 1 and 3, a crop dusting aircraft 10 is shown with the aerial dispensing apparatus 12 of the present invention incorporated into the fuselage of the aircraft. Basically, the aerial dispensing apparatus 12 includes a storage bin or hopper 14, dispensing tubes or ducts 16, 18, 20 and 22 through which powdered or granular insecticide material is carried to a plurality of dispensing outlets on the aircraft, and a unique feed mechanism 24 for transferring the insecticide material from the storage hopper 14 to the dispensing ducts in a manner such that the material is prevented from becoming compacted and remains in a desirable loose flowable condition.

Figure 3:
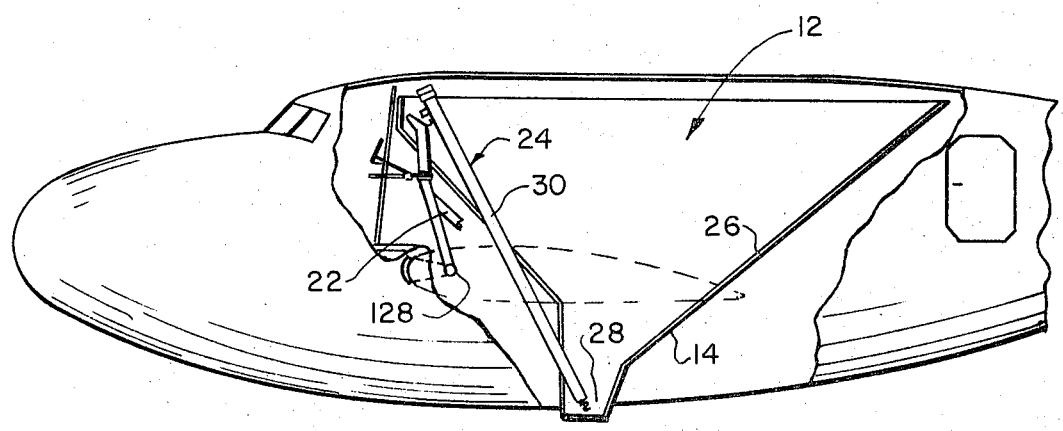
Figure 8:
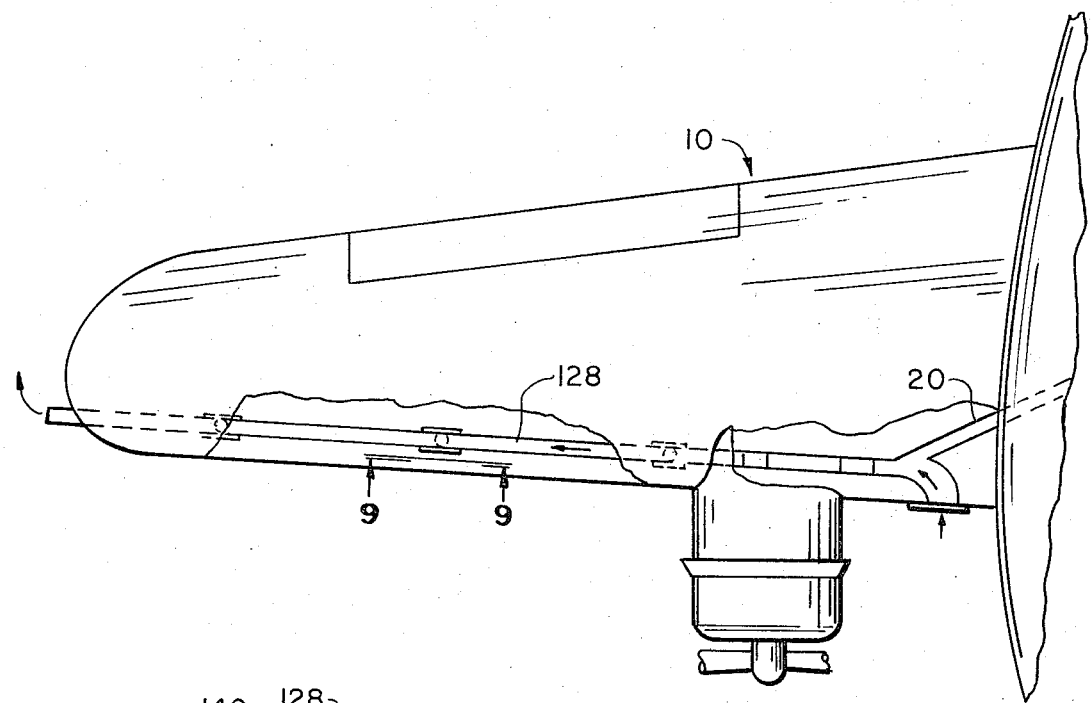
Figure 9:
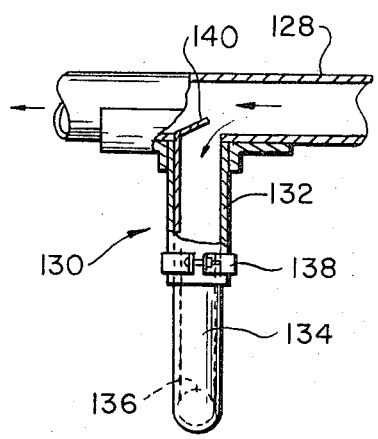

Looking more particularly at FIG. 3, the storage hopper 14 is seen to have an enlarged body portion 26 with downwardly converging walls terminating in a relatively small removal zone 28 at the bottom thereof. Insecticide material stored in the storage hopper is urged downwardly into the removal zone 28 by the downwardly convergent walls. An elevator conveyor 30 preferably having agitating characteristics, in the disclosed embodiment taking the form of an auger 32, has its lower end disposed within the removal zone 28 of the storage hopper and inclines upwardly to an upper discharge location 34 within the hopper where insecticide material positively removed from the removal zone of the storage hopper is deposited onto a filter screen 36 across the top of a feed hopper 38 situated in an upper portion of the storage hopper. The auger 32 is driven by a motor 40 and positively removes the material from the removal zone to preclude the possibility of the material becoming compacted and thereby not being capable of freely flowing from the storage hopper. The auger is enclosed within a cylindrical housing 42 which confines the insecticide material being transferred by the auger until it reaches the discharge location 34 where the material is free to pass out of the housing through a radial chute 44 as seen in FIG. 4. It can be seen in FIG. 3, that the auger housing 42 passes through adjacent walls of the storage hopper 14 in a direct path from the removal portion 28 of the storage hopper to the discharge location 34 and is conventionally sealed at the two locations where it passes through the storage hopper walls so that insecticide material will not leak from the storage hopper at these locations.

The feed hopper 38, which is best seen in FIG. 4 and is much smaller than the storage hopper 14, includes an upper collector tray 46 having an inclined lower surface 48 to urge insecticide material deposited thereon into the lower body portion 50 of the feed hopper. The body portion 50 of the feed hopper is substantially rectangular in cross-section with downwardly divergent front and rear walls 52 and 54, respectively, for a reason to be explained later. The filter screen 36 lies obliquely across the upper end of the feed hopper 38, and has a collector channel 56 along its lowermost edge to receive oversized insecticide material which does not pass through the screen filter and which could conceivably clog or impede the free flow of powdered or granular material from the feed hopper through the dispensing ducts. The oversized material can be periodically cleaned from the collector channel 56 by an operator of the apparatus or in the event excessive quantities of oversized material collects in the collector channel before an operator is able to clean the channel, the material can simply overflow to again become mingled with the insecticide material in the storage hopper 14. The smaller insecticide material, which is of a predetermined size to pass through the screen filter, drops into the collector tray 46 and slides downwardly into the body portion 50 of the feed hopper wherein it builds up on an adjustable valve or control assembly 58 forming the bottom wall of the feed hopper.

It is important to the reliable and uniform flow of the insecticide material from the feed hopper that the material be maintained in a loose flowable condition so that it is free to flow at desired rates from the feed hopper through the adjustable valve assembly 58 and into the dispensing ducts. It has been found that with a feed hopper that is relatively small so as not to hold an extraordinarily large quantity and weight of material and which has front and rear walls 52 and 54 respectively, that are downwardly divergent, compaction of the material therein is precluded in that even with the relatively small weight of the material in the hopper, the largest portions of the material are at the bottom of the hopper minimizing the pressure exerted on the material. As a further means of maintaining a loose flowable condition of the material in the feed hopper, a conventional paddle wheel agitator 60 is mounted transversely of the feed hopper in a lower portion thereof so as to be rotatably driven by a motor 62 and thereby keep the material agitated to prevent compaction. For inspection and maintenance purposes, an inspection door 64 is hinged to the front wall 52 of the body of the feed hopper and can be selectively opened to observe the condition of the material within the feed hopper.

The adjustable valve assembly 58 forming the bottom surface of the feed hopper, includes a master control gate 66 and a plurality of proportioning gates 68 defined by adjustable slide members which cooperate to regulate the flow of the insecticide material from the feed hopper into the dispensing ducts which, as will be explained hereinafter, communicate with the feed hopper through the adjustable valve assembly. The adjustable valve assembly includes upper and lower rectangular shaped guide plates 70 and 72, respectively, the upper guide plate having a centrally located rectangular opening 74 and the lower guide plate having four aligned rectangular openings 76 through which the insecticide material can pass when the master control gate and the proportioning gates are open. The upper guide plate 70 is anchored to horizontal angle from brackets 78 secured to the external surface of the front and rear walls 52 and 54, respectively, of the body portion of the feed hopper and the lower guide plate 72 is anchored to flange portions 80 of the open inner ends of the dispensing ducts 16, 18, 20 and 22. The master control gate 66 and the proportioning gates 68 are sandwiched between the upper and lower guide plates for independent sliding movement transversely of the feed hopper. The master control gate 66 includes a rectangular shaped side plate 82 protruding forwardly through a gap between the upper guide plate 70 and a spacer plate 84 and is attached at a central location in its forward edge of a clevis bracket 86 on the end of a push-pull rod 88. The push-pull rod extends forwardly and is received for slidable movement through an opening of a partition wall 90 of the aircraft on which a support bracket 92 is mounted for support of an adjustable positioning assembly 94. A brace 96 is connected to the push-pull rod 88 at an intermediate position along the length of the push-pull rod and extends obliquely away from the push-pull rod for attachment to a forward corner of the slide plate 82 to prevent the slide plate from becoming askew during sliding movement thereof between the upper and lower guide plates. An upwardly protruding attachment arm 98 is secured to the push-pull rod 88 between the clevis bracket 86 and the attachment location of the brace 96. A link arm 100 has one end pivotally attached to the attachment arm 98 and extends through the partition wall 90 of the aircraft and has its opposite end pivotally secured to an intermediate portion of a control rod 102 which in turn is pivotally connected at its lower end to a bracket 104 mounted on the partition wall 90. It can, therefore, be seen that pivotal movement of the central rod 102 between the solid line and dotted line positions of FIG. 4 will cause the push-pull rod 88 and consequently the slide plate 82 of the master control gate 66 to slide transversely of the feed hopper. The slide plate 82 of the master control gate has a rectangular-shaped opening 106 adjacent the rearward edge thereof which is moved into vertical alignment with the rectangular opening 74 in the upper guide plate when the slide plate is moved to its forwardmost position. When the slide plate 82 is moved to its rearwardmost position, as shown in FIGS. 4 and 6 the rectangular opening 106 therein moves beneath the upper guide plate and thereby blocks the opening 74 in the upper plate to prevent the passage of insecticide material from the hopper.

The positioning assembly 94 mounted on the bracket 114 has three basic fixed positions for regulating the longitudinal setting of the push-pull rod and includes secondary adjustment means for each of the three main positions so that an infinite number of longitudinal settings are provided. Since the longitudinal setting of the push-pull rod determines the longitudinal setting of the slide plate and consequently the degree of opening through the master control gate, an infinite number of predetermined degrees of opening can be obtained dependent upon the selected position of the positioning assembly. Of course, when the control rod 102 is moved between the solid line and the dotted line positions of FIG. 4, the opening through the master control gate is alternated between an open position, the degree of which is determined by the position of the positioning assembly, and a completely closed position.

The positioning assembly 94, best seen in FIG. 5, comprises a substantially triangular shaped base 108 having peripherally spaced upwardly extending arms 110 that threadedly receive adjustment bolts 112 which serve as the secondary adjustment means. The base plate 108 is pivotally mounted on the bracket 92 secured to the wall 90 for selected pivotal movement about a vertical pivot pin 116 between the three basic positions so that any one of the adjustment bolts 112 can be axially aligned with the push-pull rod 88 for adjustable abutment against the forward end thereof. It can be appreciated from FIG. 5, that the upwardly extending arms 110 are disposed at different radial distances from the pivot pin 116 so that each of the adjustment bolts 112 when axially aligned with the push-pull rod is associated with a different range of longitudinal settings of the push-pull rod determined by the basic positions and is operative to make secondary or minor adjustment to the longitudinal setting. Lock nuts 118 are provided on the adjustment bolts so that the bolts can be retained in selected positions. It will, therefore, be apparent from the foregoing that by use of the positioning assembly, the movement of the push-pull rod in the forward direction is not specifically limited to one of the three basic positions of the positioning assembly but can be further regulated by the adjustment bolts 112. Ball detent means 120 are provided on the base plate 108 and the bracket 114 to releasably retain the base plate in one of three basic positions in which one of the adjustment bolts is axially aligned with the push-pull rod. It can be appreciated that by positioning the positioner assembly 94 and the adjustment bolts 112 thereon, an infinite number of opening degrees through the master control gate 66 are easily obtainable.

As mentioned previously, the proportioning gates 68 are provided to regulate the size of the opening into the four dispensing ducts 16, 18, 20 and 22. There is a blocking plate 122 associated with each dispensing duct and is rectangular in shape with a transversely centered longitudinally extending slot 124 adjacent one end aligned with an opening in the lower guide plate 72 which receives a threaded thumbscrew 126. Accordingly, the blocking plates 122 can be moved forwardly or rearwardly within the limits of the guide slots 124 simply by loosening the thumbscrew 126, and can be positively set in any selected position by tightening the thumbscrew to draw the blocking plate into tight frictional engagement with the lower guide plate 72.

As can be seen in FIG. 6, the openings into the corresponding dispensing ducts are adjustable by the blocking plates depending upon the rate of flow desired into the particular duct. It will be appreciated that the blocking plates 122 are in vertical alignment with the four openings 76 in the lower guide plate so that the flow of insecticide material into a dispensing duct can be completely prevented by sliding the blocking plate into completely overlying relationship with the associated opening 76 or allowed at a selected rate by setting the blocking plate in a partially overlying position. It is, therefore, seen that gates 68 serve to regulate the proportions of the insecticide material flowing into the respective dispensing ducts and the master control gate 66 is essentially an on-off gate to control flow of the insecticide material from the feed hopper 38 into the dispensing ducts.

While various arrangements of dispensing ducts in the aircraft are possible, for purposes of the present disclosure, two forward dispensing ducts 16 and 18, as seen in FIGS. 1 and 2, extend outwardly from the feed hopper to transfer conduits 128 in the aircraft wings and two rearward dispensing ducts 20 and 22 extend downwardly in a rearward direction and allow the granular material to flow by gravity and by suction created across the exposed outer ends of the ducts into the air beneath the aircraft. The dispensing ducts 16 and 18, connect to the transfer conduits 128 in the wings of the aircraft in any conventional manner and preferably are provided with advancement means, not shown, for moving the material through the conduits 128 for dispersal through downwardly directed spouts 130 communicating with the conduits 128. Numerous means for moving the material through the conduits to the spouts 130 could be used, such as for example, auger conveyor means, gravity, or air pressure flow as illustrated by arrows in FIG. 8, of the type created by the arrangement described in detail in my U.S. Pat. No. 3,484,062.

The spouts 130, FIG. 9, comprise an outer downwardly directed sleeve 132 which receives an inner concentric cylinder 134 having a rearwardly directed elbow portion 136 at its lower end. The outer diameter of the cylinder 134 is slightly less than the inner diameter of the sleeve 132 so that the cylinder can slide within the sleeve. A clamping collar 138 around the sleeve serves to tighten the sleeve against the cylinder to hold it in place and with this arrangement, a deflector plate 140 on the top of the cylinder and extending into the conduit 128 to deflect material passing through the conduit into the cylinder can be adjusted various distances into the conduit for deflecting selected amounts of material. This adjustment is made simply by regulating the relative longitudinal positions of the cylinder 134 and the sleeve 132.

The aforedescribed aerial dispensing apparatus has been found to provide a reliable means for distributing in a uniform pattern granular material which is retained in a storage hopper in a crop dusting aircraft. Particular advantages of the apparatus are that the material in the feed hopper is maintained in a desired loose flowable condition for reliable and uniform passage into the dispensing ducts and that an adequate supply of the insecticide material can be retained in the feed hopper at all times. By way of illustration and not limitation, granular insecticide material such as a material marketed under the name "Mirex" by Allied Chemical Company of Jackson, Miss. having a granular size of approximately one-thirtysecond of an inch in diameter has been found to be particularly well suited for dispensing by the method and apparatus of the present invention. In a preferred arrangement of the apparatus, the storage hopper would have a 200 cubic foot capacity and the feed hopper a ½ cubic foot capacity with the screen filter across the top of the feed hopper having a mesh size of ⅜ inch to ½ inch. The insecticide material would be dispensed from the aircraft at a rate of approximately 1 cubic foot to ½ cubic foot per minute while material is transferred by conveyor from the storage hopper to the feed hopper at the rate of approximately 3 cubic feet per minute or more. In this manner more material will be deposited on the screen filter than is being removed from the feed hopper so that oversized material can be screened out and the feed hopper still maintained in a completely filled condition. If the feed hopper overflows, the overflowing material is merely deposited back into the storage hopper since the upper portion of the feed hopper is disposed within the storage hopper.

It is therefore to be understood from the foregoing description that various changes and modifications may be made therein without departing from the scope of the invention as defined by the appended claims.

What is claimed is:

1. In an aerial dispensing apparatus for aircraft, a feed mechanism for transferring granular material and the like from a storage bin to outlet dispensing means, said feed mechanism comprising feed bin means, conveyor means for positively removing granular material at a controlled rate from said storage bin, said conveyor means including upwardly from a lower portion of the storage bin and terminating in spaced relationship above the feed bin means to discharge material by gravity into said feed bin means, said conveyor means including an outer housing enclosing said conveyor means within said storage bin, an inlet at the lower end of said housing and an outlet spaced above said feed bin means, feed bin means disposed to receive and store the granular material discharged by said conveyor means, and adjustable control means between said feed bin means and said outlet dispensing means to regulate the flow of granular material from said feed bin means into said outlet dispensing means.

2. In aerial dispensing apparatus according to claim 1, said feed bin means having a smaller capacity than said storage bin and being adapted to maintain said material in a loose flowable condition.

3. In aerial dispensing apparatus according to claim 2 wherein said feed bin means has downwardly divergent sidewalls.

4. In aerial dispensing apparatus according to claim 2, said outlet dispensing means comprising a plurality of tubular members having one end in communication with said feed bin means through said adjustable control means and open opposite ends disposed to emit the granular material into the air adjacent the aircraft, said adjustable control means including proportional means for selectively determining the proportional amounts of granular material to be dispensed through each tubular member.

5. In aerial dispensing apparatus according to claim 4, said proportional means comprising an adjustable slide members disposed for blocking selected portions of said one end of the tubular members to thereby control the proportional amounts of granular material flowing into each tubular member.

6. In aerial dispensing apparatus according to claim 4, said adjustable control means further including a master control means for controlling the rate of flow of granular material out of the feed bin.

7. In aerial dispensing apparatus according to claim 6, said master control means having a control actuator for opening and closing said control means, and adjustment means for regulating the degree to which the master control means can open.

8. In aerial dispensing apparatus according to claim 7, said control actuator comprising a manually operable control lever and said master control means comprising a slide gate movable between open and closed positions by said control lever.

9. In aerial dispensing apparatus according to claim 8, said adjustment means comprising manually adjustable stop means for limiting movement of the slide gate to thereby regulate the degree to which the slide gate allows granular material to flow from the feed bin.

10. In aerial dispensing apparatus according to claim 1, further including an inclined filter screen across the top of the feed hopper to prevent material exceeding a predetermined particle size from passing into the feed hopper.

11. In an aerial dispensing apparatus adapted for incorporation into an aircraft and having a main storage bin in the fuselage for granular material and the like, a plurality of dispensing conduits arranged in the wings of the aircraft to distribute the granular material over a predetermined area, the improvement comprising a feed mechanism for feeding granular material from the storage bin to the dispensing conduits, said feed mechanism comprising conveyor means having one end communicating with a lower portion of said storage bin so as to withdraw granular material at a controlled rate from said storage bin, a feed bin at least partially disposed within said storage bin and located at the opposite end of said conveyor to receive material carried by said conveyor, an inclined filter within the storage bin mounted to filter material of a predetermined particle size is allowed to pass into the feed bin, said feed bin having downwardly divergent walls to maintain the granular material in a loose flowable condition, said feed bin having a bottom wall including an adjustable valve assembly to control the flow of granular material into the dispensing conduits, said adjustable valve assembly having a master control gate including a master control actuator for effecting movement of the master control gate between open and closed positions to control the flow of granular material from the feed bin and adjustable gates associated with each dispensing conduit whereby a proportional amount of granular material flowing from the feed bin through each adjustable gate into the dispensing conduits can be regulated.

12. In an aerial dispensing apparatus according to claim 11, said conveyor comprising an enclosed auger and further including means for advancing the granular material through the dispensing conduits in a uniform and reliable manner to effect a uniform distribution of the material over a preselected area beneath the aircraft.

13. A method of dispensing granular material from an aircraft comprising the steps of storing a quantity of granular material in a storage bin on an aircraft, mechanically conveying selected quantities of the material from the storage bin to a feed bin on the aircraft, feeding the material at a selected rate into dispensing ducts on the aircraft, and distributing the material from the dispensing ducts over a predetermined area beneath the aircraft.

14. The method of claim 13 wherein said granular material is mechanically conveyed from a lower portion of the storage bin and elevated to a position above the feed bin where it is deposited by gravity into the feed bin.

15. The method of claim 14 wherein the granular material is fed into the dispensing ducts by gravity.

* * * * *

PO-1050
(5/69)

UNITED STATES PATENT OFFICE
CERTIFICATE OF CORRECTION

Patent No. 3,860,202            Dated   14 January 1975

Inventor(s) Johnson, Ralph S.

It is certified that error appears in the above-identified patent and that said Letters Patent are hereby corrected as shown below:

Column 2, line 44, cancel "2" and insert -- 3 --.

Column 4, line 44, cancel "from" and substitute -- iron --

Column 5, line 11, cancel "central" and substitute -- control --;
                line 60, after "by the", insert -- three --.

Column 7, line 57, cancel "including" and substitute -- inclining --.

Signed and sealed this 29th day of April 1975.

(SEAL)
Attest:

RUTH C. MASON  
Attesting Officer

C. MARSHALL DANN  
Commissioner of Patents  
and Trademarks